Dec. 20, 1960   R. L. JAESCHKE   2,965,777
LIQUID-COOLED ELECTROMAGNETIC COUPLING
Filed Feb. 19, 1958   3 Sheets-Sheet 1

INVENTOR.
RALPH L. JAESCHKE
BY Hudson, Boughton,
Williams, David & Hoffmann
ATTORNEYS Dec. 20, 1960 R. L. JAESCHKE 2,965,777
LIQUID-COOLED ELECTROMAGNETIC COUPLING
Filed Feb. 19, 1958 3 Sheets-Sheet 3

INVENTOR.
RALPH L. JAESCHKE
BY Hudson, Boughton,
Williams, David & Hoffmann
ATTORNEYS United States Patent Office 2,965,777
Patented Dec. 20, 1960

2,965,777

LIQUID-COOLED ELECTROMAGNETIC COUPLING

Ralph L. Jaeschke, Kenosha, Wis., assignor to Eaton Manufacturing Company, Cleveland, Ohio, a corporation of Ohio Filed Feb. 19, 1958, Ser. No. 716,238

10 Claims. (Cl. 310—105)

This invention relates to electromagnetic couplings for torque transmitting purposes and, as its principal object, aims to provide a novel construction for such couplings for accomplishing liquid cooling thereof with minimum power loss due to the frictional resistance or drag effect of the cooling liquid.

Another object is to provide novel liquid-cooled electromagnetic coupling means comprising field and inductor rotors having co-operating opposed peripheral portions separated by an intervening air gap and in which one of such portions has cooling liquid conducting grooves therein and lying on one side of the air gap.

A further object is to provide such a liquid-cooled coupling in which the field rotor has spaced pole portions thereon and the inductor rotor has an annular drum-like portion surrounding the field rotor and wherein the grooves are formed in an internal wall or surface of the drum portion.

As still another object this invention provides such a liquid-cooled coupling wherein the grooves are of such number and arrangement, relative to the rotation axis and pole members, as to utilize centrifugal action in feeding the cooling liquid to the grooves and to achieve quietness of operation with minimum power loss due to the drag of the liquid or to any reduced flux interlinkage between the field and inductor rotors.

Additionally, this invention provides novel liquid-cooled coupling means of the character mentioned above and which includes automatic valve means controlling the conduit means for the cooling liquid, the conduit means preferably including a normally open bypass means and the flow capacity of the grooves being at least as great as the flow capacity of the bypass means.

Other objects and advantages of this invention will be apparent in the following detailed description and in the accompanying drawings forming a part of this specification and in which, Fig. 1 is an elevational view of an electromagnetic coupling embodying this invention;

Figure 1:
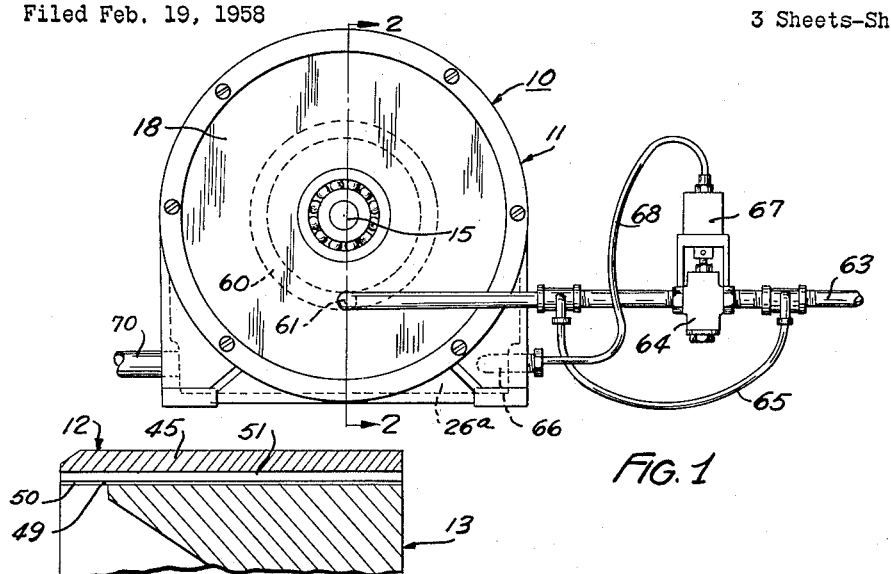

The liquid-cooled electromagnetic coupling 10 of this invention comprises, in general, an outer housing 11 and rotor means operable therein and consisting of co-operating field and inductor rotors 12 and 13. The coupling also comprises rotatable input and output shafts having a common rotation axis and connected with the respective rotors. The shafts 14 and 15 are axially aligned and have the field and inductor rotors 12 and 13 suitably secured on the inner ends thereof.

The housing 11 is of a suitable construction having axially spaced end walls 17 and 18, a peripheral wall 19 between the end walls, and a base 20 on which the coupling is adapted to stand. The end walls 17 and 18 are provided with bosses 21 and 22 having antifriction bearings 23 and 24 mounted therein and rotatably supporting the shafts 14 and 15.

The housing 11 defines a chamber 26 in which the field and inductor rotors 12 and 13 are rotatable, and the lower portion of the chamber forms a collecting space or chamber 26ª for cooling liquid which has been supplied to the rotor means as will be described hereinafter. Suitable packings 28 and 29 are provided adjacent the bosses 21 and 22 and in surrounding relation to the shafts 14 and 15 for preventing leakage of cooling liquid into or through the bearings 23 and 24.

The field rotor 12 comprises complemental annular rotor members or pole rings 31 and 32 which are secured together by suitable screws 33 and form the peripheral or pole-carrying portion of this rotor. The field rotor 12 also includes a hub portion 34 by which this rotor is mounted on the shaft 14 and a radial disk portion 35 extending between and connecting the pole ring 31 with the hub 34.

Figure 3:
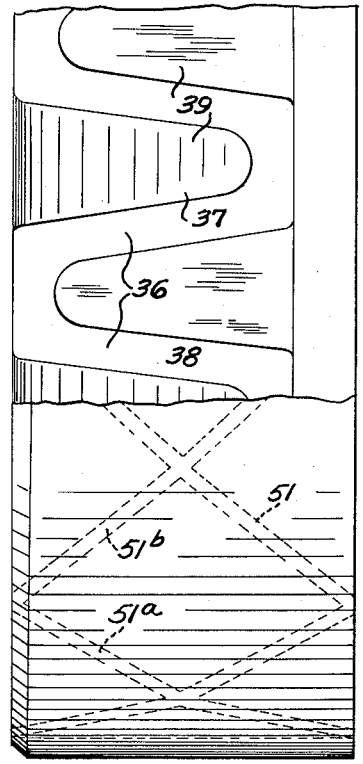
Fig. 3 is an elevational view with portions in section and showing, in a somewhat diagrammatic manner, the shape and location of the pole members in relation to the drum portion of the inductor rotor and the liquid conducting grooves of the latter.

The rotor members 31 and 32 carry axially extending finger-like projections 37 and 38 which are disposed in an interdigitating relation as shown in Fig. 3 and form an annular series of pole members 39 extending around the periphery of the field rotor 12. The axial projections 37 of the rotor member 31 constitute one group of such pole members which are disposed in a circumferentially spaced relation and extend toward the rotor member 32. Likewise, the axial projections 38 of the rotor member 32 constitute another group of such circumferentially spaced pole members and extend toward the rotor member 31. The pole projections of one group extend into the spaces between the pole projections of the other group with air gaps 36 remaining between the adjacent pole members.

The field rotor 12 also includes energizing winding means which is here shown as comprising an annular or toroidal field coil 40 located in an annular recess or pocket 41 formed by co-operating portions of the rotor members 31 and 32. The rotor members 31 and 32 are made of a suitable magnetic material, such as a ferromagnetic material or alloy, and the portions of these rotor members which form the chamber 41 for the field coil 40 also form a magnetic path extending substantially around the coil and including the interdigitated pole members 39. Energizing current can be supplied to the field coil 40 from any available current source and, for this purpose, lead conductors 42 extend from the ends of the coil through conduit means carried by the field rotor and which includes a radial portion 43ª located between the connected members 31 and 32 of the field rotor 12 and an axial portion 42ᵇ located in an axial groove of the shaft 14.

The induction rotor 13 comprises an annular drum member or portion 45 extending around the field rotor 12 in a circumferentially spanning relation to the pole members 39 and a wheel-like portion or member carrying such drum member or portion. The wheel-like member comprises a radial disk portion 46 and a central hub portion 47 by which the inductor rotor is secured on the shaft 15. The drum member 45 is here shown as being suitably fixed on the periphery of the disk portion 46 and is of an axial length to extend across the pole members 39 for flux linkage with the latter. The drum member 45 is separated from the periphery of the field rotor 12 by an intervening annular air gap 49 extending between the pole members 39 and the internal annular face or wall 50 of the drum member. The inductor rotor is also separated from the field rotor by a radially and annularly extending space or passage 48 located between the rotor member 32 and the disk portion 46.

In accordance with the present invention, provision is made in the coupling 10 for liquid cooling thereof in such a manner that the cooling action will be achieved without objectionable hum or noise and with minimum frictional resistance or drag due to the presence of the cooling liquid. This is accomplished by providing the internal wall or peripheral annular surface 50 of the drum member 45 with transverse grooves 51 for conducting the cooling liquid through the rotor means in a heat-exchange relation thereto.

Figure 6:
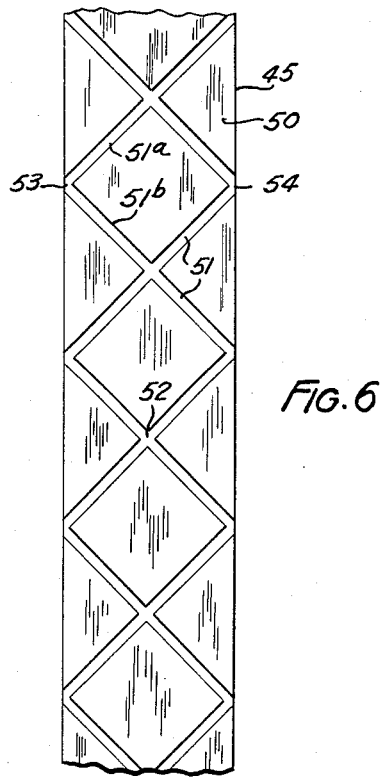
Fig. 6 is a development view of the grooved inner surface of the drum member.
Figure 5:
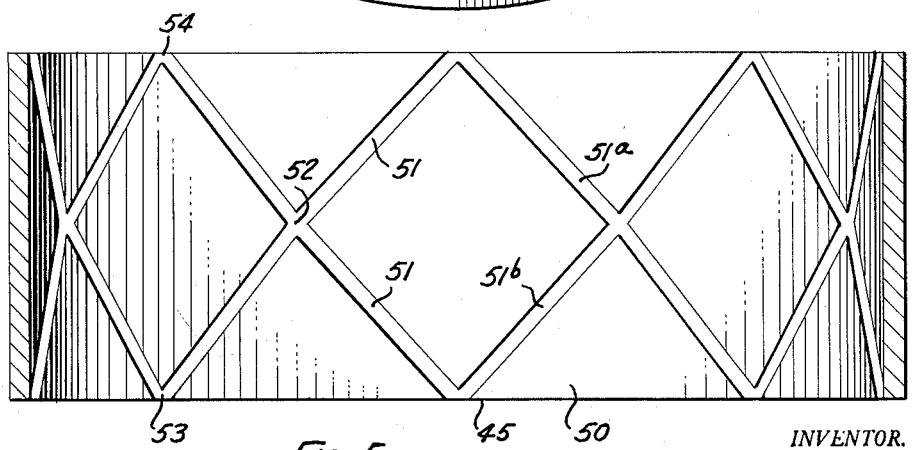
Fig. 5 is a transverse section through the drum member and taken as indicated by section line 5—5 of Fig. 4.

The grooves 51 are radially-open grooves formed in the drum member 45 by any suitable grinding or machining operation, and are here shown as comprising two sets of such grooves 51$^a$ and 51$^b$. The grooves 51$^a$ are inclined in one direction relative to the rotation axis of the shafts 14 and 15 at a suitable angle thereto such as a 45° angle, and the grooves 51$^b$ are inclined in the opposite direction and at a similar angle to the rotation axis. As shown in the drawings, the grooves 51$^a$ of one set constitute one group of parallel grooves and the grooves 51$^b$ of the other set constitute another group of parallel grooves. The grooves of the two sets extend in a crossing relation to each other, as shown in Figs. 3, 5 and 6, and the crossing points 52 lie in or adjacent the mid-plane of the field rotor 12. The two sets of grooves 51$^a$ and 51$^b$ are located in the drum member 45 so as to have common starting points or end junctions 53 and 54 at opposite edges of the drum member as shown in Figs. 3, 5 and 6.

From the arrangement and location of the grooves 51 on the drum member 45 as above-described and shown in the drawings, it will be seen that the two sets of these grooves are in a symmetrical arrangement. The provision of two sets of grooves in such a symmetrical arrangement is desirable so that the coupling 10 will be usable for either direction of rotation with equally good performance of the cooling means provided by this invention.

The grooves are provided in suitable number and the circumferential angular spacing of the grooves of each set is such, in relation to the number of pole members 39 of the field rotor, that the number of grooves is different from the number of pole members in the annular series. It is also desirable that the number of grooves and the number of pole members have an irrational relationship to each other. In other words, if the grooves of the set 51$^a$ consist of eight grooves spaced apart at circumferential angular distances of 45° and the pole members 39 consist of twelve such pole members spaced apart at circumferentially angular distances of 30°, the grooves and pole members will have such a desired irrational relationship inasmuch as neither of the numbers 8 nor 12 is evenly divisible by the other.

When the cooling liquid conducting grooves 51 are disposed in the symmetrical and oppositely inclined relation above described and in a number which is irrational with respect to the number of pole members of the field rotor, a smooth and quiet operation of the coupling will be obtained for either direction of torque transmitting rotation. It will also be seen that when the grooves 51 are located in the internal surface or wall 50 of the drum member 45, they will lie radially outward of the annular air gap 49 such that centrifugal action will assist the movement of cooling liquid into and along the grooves during the operation of the coupling.

Cooling liquid, such as water, is supplied to the grooves 51 by suitable passage means provided in the rotor means of the coupling and having communication with these grooves. In the coupling 10, as herein disclosed, the space or passage 48 is utilized for supplying the liquid to the grooves 51 by having this passage communicate around its outer edge with the grooves adjacent the mounting point of the drum member 45 on the disk portion 46. The flow of the cooling liquid is indicated by the arrows 56.

Figure 2:
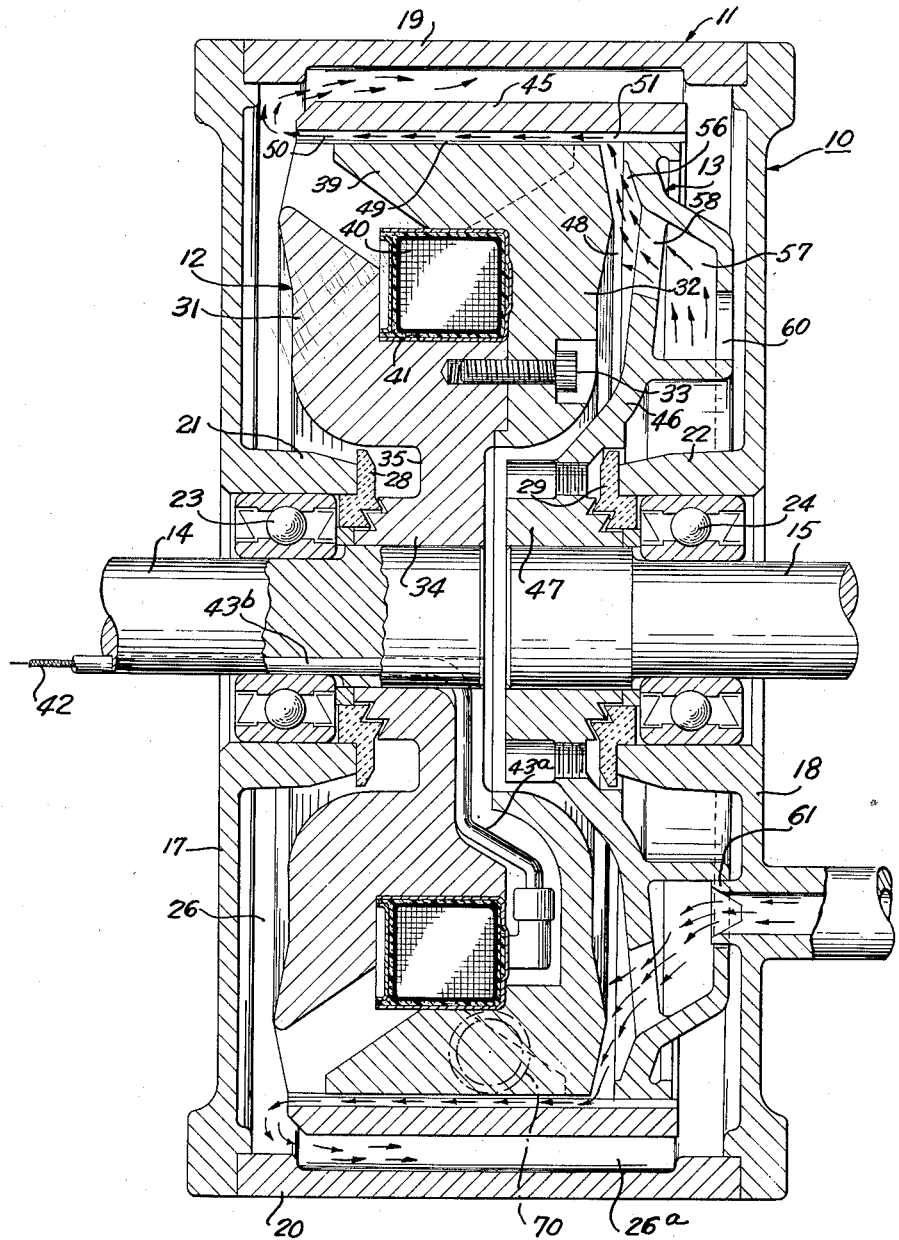
Fig. 2 is a vertical axial section on a larger scale and taken through the coupling as indicated by section line 2—2 of Fig. 1.
Figure 4:
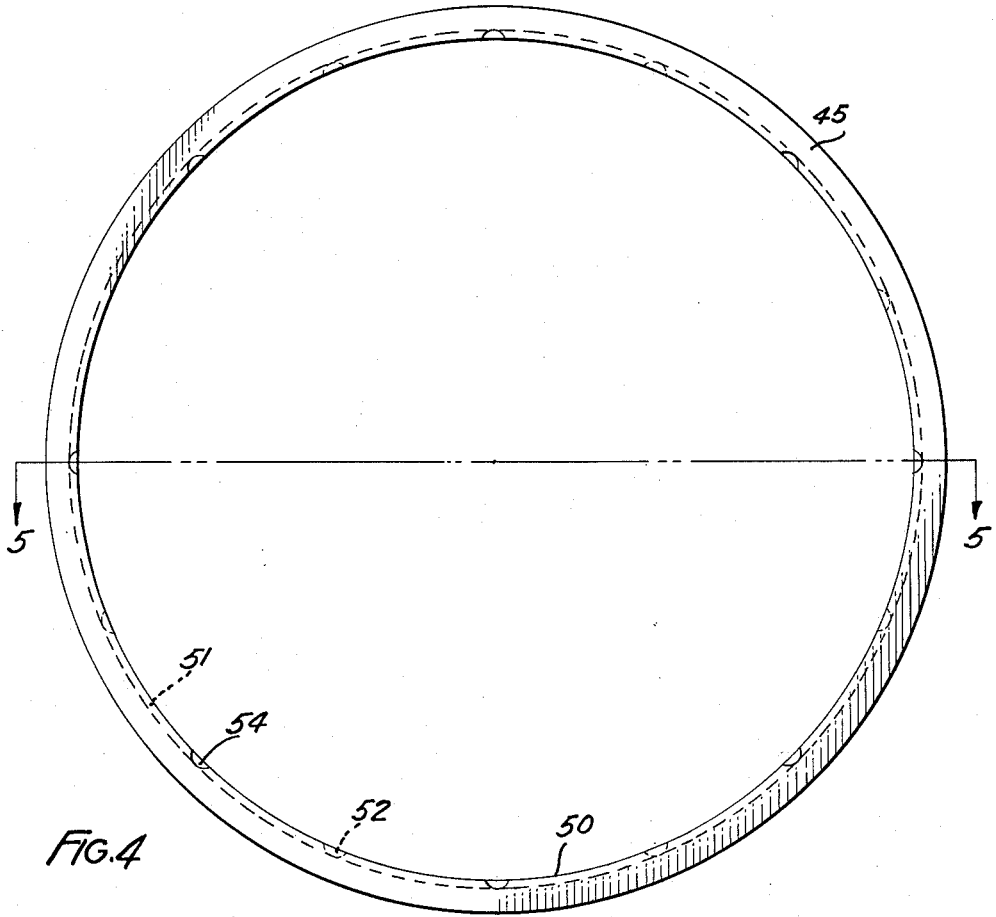
Fig. 4 is an end view of the drum member of the inductor rotor in detached relation.

The supply passage means for the cooling liquid also comprises an annular pocket 57 formed by wall portions of the inductor rotor 13 and located on the disk portion 46 thereof. The pocket 57 communicates with the radial passage 48 through circumferentially spaced connecting openings 58 and is provided, on the side thereof facing the end wall 18 of the housing 11, with an open annular slot 60. The end wall 18 supports a nozzle member 61 or the like which registers with the annular slot 60, as by projecting part way into the pocket as shown in Fig. 2, for directing the cooling liquid into the pocket.

The cooling liquid supply means also comprises a main conduit line 63 extending to the nozzle 61 from a tank, pump or other suitable source of cooling liquid. The conduit line 63 is controlled by an automatic temperature responsive control or shut-off valve 64 and includes a normally open bypass 65 around the valve.

The valve 64 is actuatable in response to predetermined temperature variations occurring in the cooling liquid which collects in the chamber 26$^a$ of the housing 11 and, for this purpose, a temperature-responsive bulb 66 is located in the collecting chamber 26$^a$ and is connected with a pressure-responsive valve actuating means or device 67 of the valve 64 by means of a tube or conduit 68. The grooves 51 of the inductor rotor 13 are of a suitable depth and cross-sectional area and the flow capacity of these grooves always exceeds the flow capacity of the normally open bypass 65.

In the operation of the electromagnetic coupling 10, the rotors 12 and 13 are coupled by the flux generated by the field winding 40 for the transmission of torque therebetween and excess heat generated in the coupling, by eddy current and the like, will be carried away by the cooling liquid. When the coupling is operating under a relatively light load, the valve 64 will be closed and the flow of cooling liquid through the normally open bypass 65 will be adequate for carrying away the excess heat and causing the operating temperature of the coupling to be maintained within the desired range.

If the load on the coupling increases and the temperature of the cooling liquid in the collecting chamber 26$^a$ rises correspondingly, pressure will be transmitted from the bulb 66 to the actuating means 67 to cause opening of the valve 64, whereupon additional cooling liquid will be supplied through the main conduit 63 for a more rapid and effective cooling of the rotor means. When the load on the coupling again decreases, and the temperature of the liquid in the collecting chamber 26$a$ falls correspondingly, the valve 64 will be reclosed as by spring means contained in the actuating means 67 and the quantity of cooling liquid will again be the volume provided by the flow-capacity of the normally open bypass 65.

The housing 11 is provided at a suitable point thereof with a discharge outlet 70 for the cooling liquid.

From the construction and operation above described, it will accordingly be seen that the amount of cooling liquid being supplied during operation of the coupling 10 under light load will always be accommodated in the grooves 51 and the air gap 49 will be left relatively free of cooling liquid and there will be very little, if any, added resistance to relative rotation between the rotor members due to the drag or frictional resistance of the cooling liquid. Since various other advantages of the cooling means provided by this invention have already been described above in this specification, they need not here be repeated.

Although the liquid-cooled electromagnetic coupling of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In an electromagnetic coupling, rotatable power input and output shafts having a common rotation axis, a field rotor connected with one of said shafts and carrying pole members and a field winding, an inductor rotor connected with the other of said shafts and having a drum portion disposed so as to provide a peripheral annular wall extending around and facing toward said field rotor, said drum portion having two sets of internal grooves extending transversely thereof in an inclined relation to said axis and providing channels in said wall for receiving cooling liquid, the grooves of one set being oppositely inclined with respect to the grooves of the other set and in crossing relation thereto with the crossing points lying substantially in the midplane of the drum, and means for supplying cooling liquid to said grooves.

2. In an electromagnetic coupling, rotatable power input and output shafts having a common rotation axis, an inner field rotor connected with one of said shafts and carrying pole members and a field winding, an outer inductor rotor connected with the other of said shafts and having a drum portion extending around said field rotor, said drum portion having an internal annular wall spaced from said pole members by an intervening annular air gap and said wall being provided with grooves lying radially outward of said air gap and which are open on the side thereof facing the air gap, and means for supplying cooling liquid including passage means in said inductor rotor radially inward of said drum portion and disposed to deliver the liquid to said grooves by centrifugal action during operation of said coupling, said grooves extending transversely across said drum portion in an inclined relation to said axis and providing channels for conducting said liquid across said drum portion, the inclined relation of said grooves being effective during the rotation of said inductor rotor to impart movement to the liquid in a direction along the grooves.

3. In an electromagnetic coupling, a housing, rotor means in said housing comprising a field rotor and an inductor rotor, said field rotor having an annular series of pole members and field winding means for producing magnetic flux in said pole members, said inductor rotor having a drum portion extending around said field rotor and spaced from said pole members by an annular air gap, said drum portion having transversely extending cooling liquid conducting grooves in the wall thereof facing said pole members, said rotor means having supply passage means therein communicating with said grooves and including an annular pocket on said inductor rotor radially inward of said grooves for centrifugal feeding of liquid to said grooves during rotation of said inductor rotor, said pocket having an annular access slot leading thereinto, and inlet means for the cooling liquid comprising a hollow inlet projection on said housing in register with said slot.

4. In an electromagnetic coupling, a housing having a liquid collecting chamber in the lower portion thereof, rotatable input and output shafts having a common rotation axis, rotor means in said housing comprising a field rotor and an inductor rotor connected with said shafts, said field rotor having an annular series of pole members and field winding means for producing magnetic flux in said pole members, said inductor rotor having a drum portion extending around said field rotor and spaced from said pole members by an annular air gap, said drum portion having grooves in the wall thereof facing said pole members, said grooves extending transversely across said drum portion in an inclined relation to said axis and providing channels in the inner peripheral wall of said drum portion for conducting cooling liquid across the latter, said rotor means having passage means therein communicating with said grooves, cooling liquid supply conduit means extending to said housing for supplying cooling liquid to said grooves through said passage means, valve means controlling said conduit means, and means responsive to the temperature of liquid in said chamber for causing automatic actuation of said valve means, the inclined relation of said grooves being effective during the rotation of said inductor rotor to impart movement to the liquid in a direction along the grooves.

5. In an electromagnetic coupling, a housing having a liquid collecting chamber in the lower portion thereof, rotatable input and output shafts having a common rotation axis, rotor means in said housing comprising a field rotor and an inductor rotor connected with said shafts, said field rotor having an annular series of pole members and field winding means for producing magnetic flux in said pole members, said inductor rotor having a drum portion extending around said field rotor and spaced from said pole members by an annular air gap, said drum portion having grooves in the wall thereof facing said pole members, said grooves extending transversely across said drum portion in an inclined relation to said axis and providing channels in the inner peripheral wall of said drum portion for conducting cooling liquid across the latter, said rotor means having passage means therein communicating with said grooves, cooling liquid supply conduit means extending to said housing for supplying cooling liquid to said grooves through said passage means, valve means controlling said conduit means, normally open bypass means extending in bypass relation to said valve means, and means responsive to the temperature of liquid in said chamber for causing automatic actuation of said valve means, the inclined relation of said grooves being effective during the rotation of said inductor rotor to impart movement to the liquid in a direction along the grooves.

6. An electromagnetic coupling as defined in claim 5 and wherein the flow capacity of said grooves is at least as great as the flow capacity of said bypass means.

7. In an electromagnetic coupling, rotatable power input and output shafts having a common rotation axis, an inner field rotor connected with one of said shafts and carrying pole members and a field winding, an outer inductor rotor connected with the other of said shafts and having a drum portion extending around said field rotor, said drum portion having an internal annular wall spaced from said pole members by an intervening annular air gap and said wall being provided with grooves lying radially outward of said air gap and which are open on the side thereof facing the air gap, and cooling liquid supply means providing a supply passage having its discharge portion located within the enclosure area of said drum portion axially inward of one end thereof and extending axially and radially of said drum portion for the delivery of the liquid in a radical outward direction into said grooves, the liquid thus supplied to said grooves being biased toward the bottoms of the grooves by centrifugal action during operation of the coupling, said grooves extending transversely across said drum portion in an inclined relation to said axis and providing channels for conducting said liquid across said drum portion, the inclined relation of said grooves being effective during the rotation of said inductor rotor to impart movement to the liquid in a direction along the grooves.

8. An electromagnetic coupling as defined in claim 7 and wherein the number of said pole members and the number of said grooves are irrational numerical values with respect to each other.

9. An electromagnetic coupling as defined in claim 7 and wherein said grooves are parallel and are of a different circumferential angular spacing than said pole members.

10. An electromagnetic coupling as defined in claim 7 wherein said grooves comprise two sets of parallel grooves inclined in opposite directions relative to said axis and disposed so that the grooves of one set extend in a crossing and intersecting relation to the grooves of the other set.

References Cited in the file of this patent

UNITED STATES PATENTS

| | | |
|---|---|---|
| 2,068,820 | Sarazin | Jan. 26, 1937 |
| 2,392,148 | Hornbostel | Jan. 1, 1946 |
| 2,453,509 | Hugin | Nov. 9, 1948 |
| 2,600,277 | Smith | June 10, 1952 |
| 2,668,922 | Burdick | Feb. 9, 1954 |
| 2,745,974 | Oetzel | May 15, 1956 |
| 2,774,895 | Zuckermann | Dec. 18, 1956 |
| 2,780,737 | Labastie | Feb. 5, 1957 |
| 2,803,764 | Lundskow | Aug. 20, 1957 |

FOREIGN PATENTS

| | | |
|---|---|---|
| 585,524 | Great Britain | Feb. 10, 1947 |
| 671,314 | Great Britain | Apr. 30, 1952 |